United States Patent
Martin

(10) Patent No.: US 11,549,641 B2
(45) Date of Patent: Jan. 10, 2023

(54) DOUBLE JOURNAL BEARING IMPELLER FOR ACTIVE DE-AERATOR

(71) Applicant: PRATT & WHITNEY CANADA CORP., Longueuil (CA)

(72) Inventor: Bruno Martin, Saint-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 368 days.

(21) Appl. No.: 16/936,606

(22) Filed: Jul. 23, 2020

(65) Prior Publication Data

US 2022/0026021 A1    Jan. 27, 2022

(51) Int. Cl.
*F16N 39/00* (2006.01)
*F01D 25/18* (2006.01)
*F02C 7/06* (2006.01)

(52) U.S. Cl.
CPC ........... *F16N 39/002* (2013.01); *F01D 25/18* (2013.01); *F02C 7/06* (2013.01); *F05D 2220/323* (2013.01); *F05D 2260/609* (2013.01); *F05D 2260/98* (2013.01)

(58) Field of Classification Search
CPC ........ F16N 39/0002; F04D 11/00; F02C 7/06; F01D 25/18; F05D 2260/609; F05D 2260/98
See application file for complete search history.

(56) References Cited

U.S. PATENT DOCUMENTS

| | | |
|---|---|---|
| 3,424,372 A | 1/1969 | Blattner et al. |
| 4,414,006 A | 11/1983 | Armstrong |
| 4,422,821 A * | 12/1983 | Smith ............ B04B 5/10 415/89 |
| 4,714,139 A | 12/1987 | Lorenz et al. |
| 5,114,446 A | 5/1992 | Giersdorf et al. |
| 5,584,650 A | 12/1996 | Redmond et al. |
| 5,618,335 A | 4/1997 | Pink et al. |
| 5,890,883 A | 4/1999 | Golding et al. |
| 6,007,311 A | 12/1999 | Cygnor et al. |
| 6,139,272 A | 10/2000 | Thyberg et al. |

(Continued)

FOREIGN PATENT DOCUMENTS

| | | |
|---|---|---|
| DE | 749024 | 9/1952 |
| DE | 1114437 | 9/1961 |

(Continued)

OTHER PUBLICATIONS

European Search Report dated Oct. 1, 2021, EP Application No. 21173769.7.

*Primary Examiner* — Michael R Mansen
*Assistant Examiner* — Mark K Buse
(74) *Attorney, Agent, or Firm* — Norton Rose Fulbright Canada LLP

(57) ABSTRACT

An active de-aerator for an aircraft engine is provided, with a housing having an air-oil inlet, an oil outlet and an air outlet. An impeller is received within and rotatable relative to the housing about a central axis. The active de-aerator has a first journal bearing on a first side of the impeller for rotatably supporting the impeller relative to the housing and a second journal bearing on a second side of the impeller for rotatably supporting the impeller relative to the housing, the second side being opposite the first side.

20 Claims, 5 Drawing Sheets

(56) References Cited

U.S. PATENT DOCUMENTS

| | | | |
|---|---|---|---|
| 6,986,647 B2 | 1/2006 | Jones et al. | |
| 7,758,320 B2 | 7/2010 | Pham et al. | |
| 10,018,087 B2* | 7/2018 | Prunera-Usach | ...... B01D 50/20 |
| 10,036,508 B2 | 7/2018 | Bordne et al. | |
| 10,322,362 B2 | 6/2019 | Ishida et al. | |
| 2018/0119617 A1* | 5/2018 | Pulter | ................ B01D 19/0026 |
| 2019/0308128 A1 | 10/2019 | Brouillet et al. | |

FOREIGN PATENT DOCUMENTS

| | | |
|---|---|---|
| EP | 2199614 | 6/2010 |
| EP | 3315182 | 5/2018 |

* cited by examiner

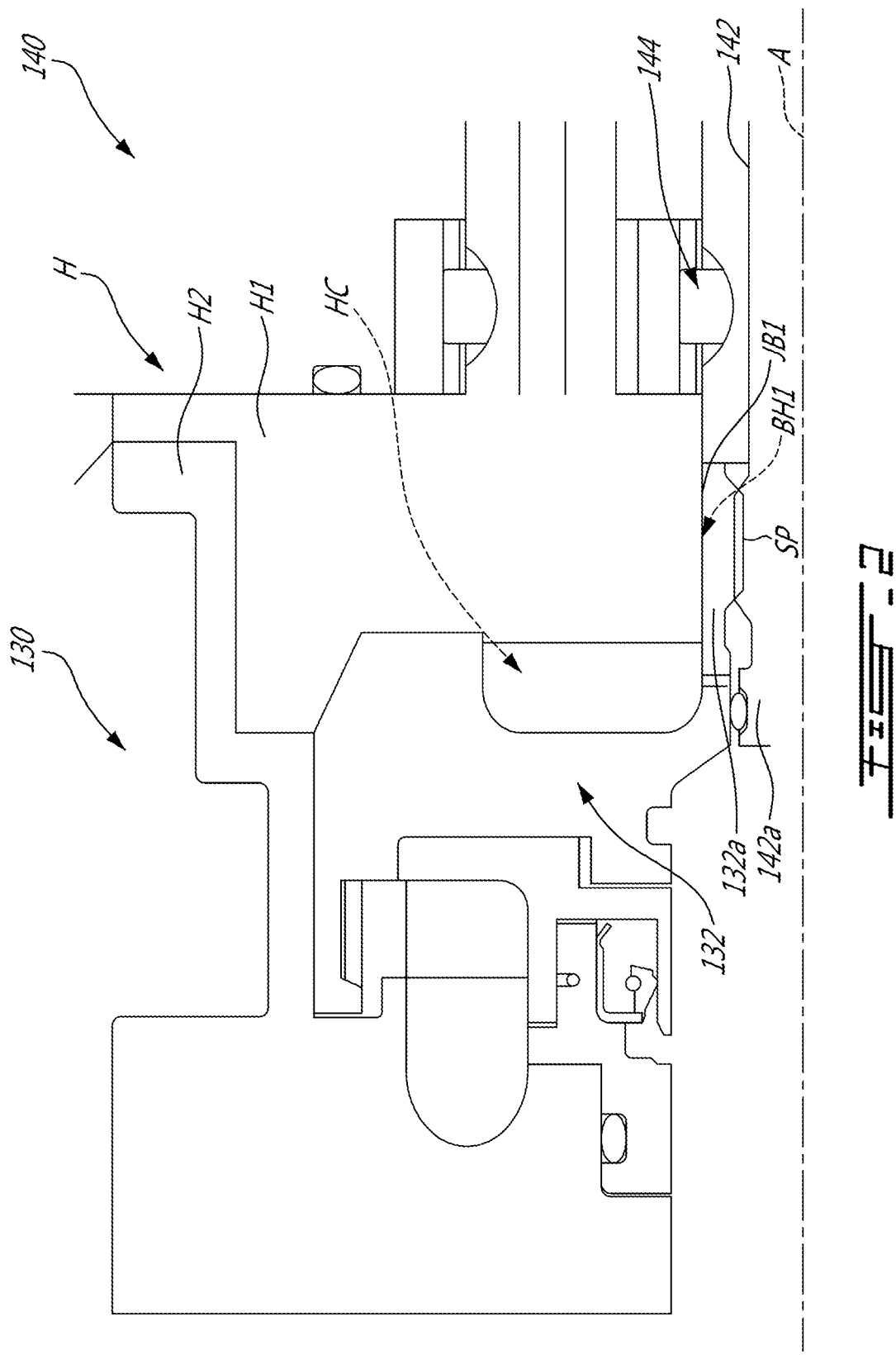

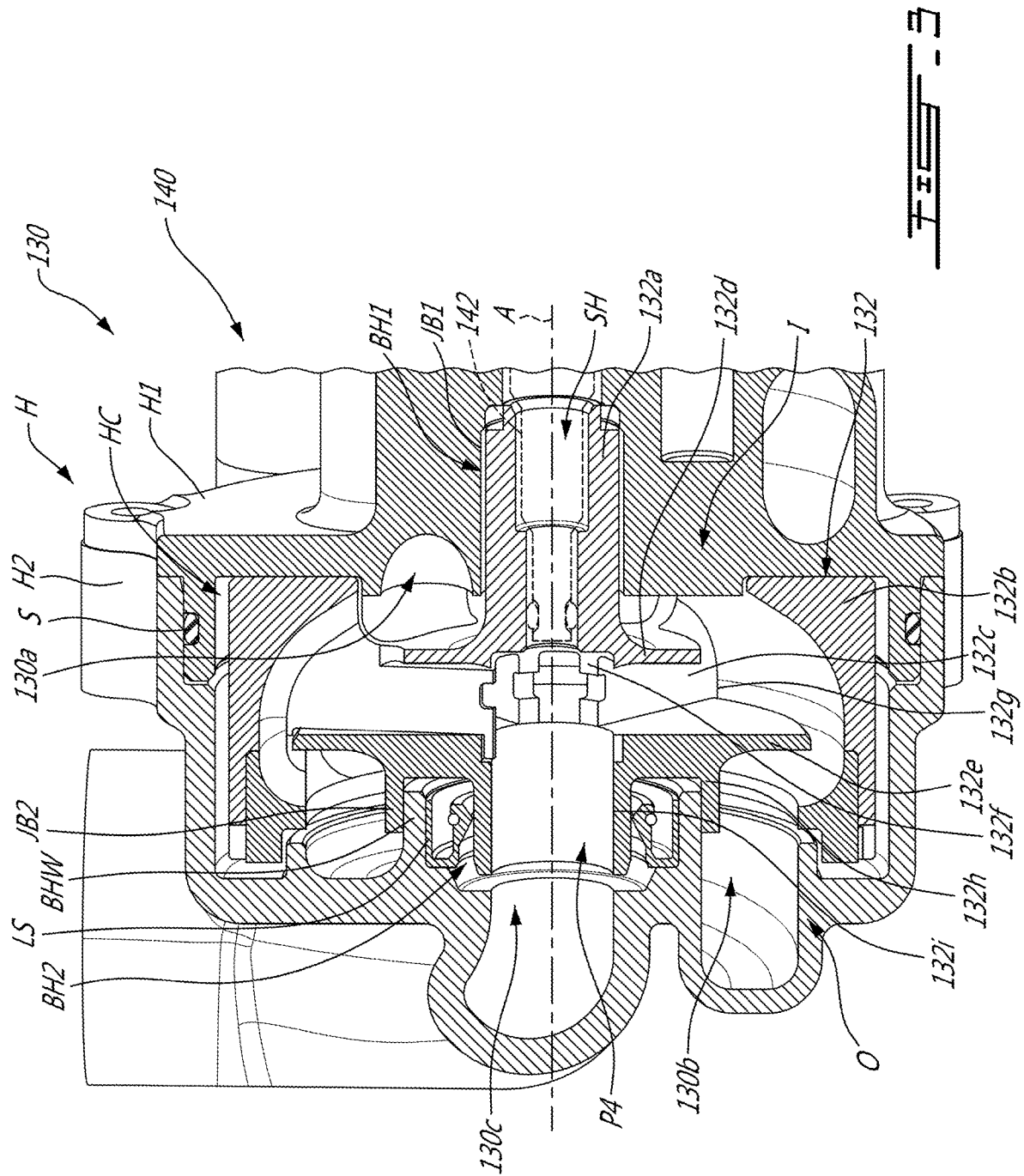

DOUBLE JOURNAL BEARING IMPELLER FOR ACTIVE DE-AERATOR

TECHNICAL FIELD

The disclosure relates generally to lubrication systems of aircraft engines and, more particularly, to systems and methods used to separate air from oil flowing in such lubrication systems.

BACKGROUND OF THE ART

Aircraft engines, such as gas turbine engines, include a lubrication system for distributing a lubricating fluid, such as oil for instance, to portions of the engine. This lubricating oil may be directed to and from a bearing cavity of the aircraft engine, for example. Air may become mixed with the oil due to the compressed air used for pressurizing the bearing cavity, and the amount of air in the lubricating oil may thus increase after the oil has been fed through the bearing cavity. A de-aerator may be used in the lubrication system to remove at least a portion of the air from the oil. In use, such de-aerator may be subject to rotor vibrations, for instance as a result of the turbulent flow of mixed oil and air flowing therethrough.

SUMMARY

In one aspect, there is provided an active de-aerator for an aircraft engine, comprising: a housing having an air-oil inlet, an oil outlet and an air outlet; an impeller received within and rotatable relative to the housing about a central axis; a first journal bearing on a first side of the impeller for rotatably supporting the impeller relative to the housing; and a second journal bearing on a second side of the impeller for rotatably supporting the impeller relative to the housing, the second side being opposite the first side.

In another aspect, there is provided a lubrication system of an aircraft engine, comprising: a lubricant reservoir fluidly connected to lubrication conduits; at least one pump fluidly connected to the lubricant reservoir and the lubrication conduits for inducing a flow of lubricant within the lubrication conduits, the pump having a housing and a pump shaft mounted for rotation about a central axis within the housing, the housing defining an air-oil inlet, an oil outlet and an air outlet; and a de-aerator having an impeller received within and rotatable relative to the housing about the central axis, the impeller connected to the pump shaft for rotation therewith, a first journal bearing on a first side of the impeller for rotatably supporting the impeller relative to the housing, and a second journal bearing on a second side of the impeller for rotatably supporting the impeller relative to the housing, the second side being opposite the first side.

In a further aspect, there is provided a method of mounting an active de-aerator to an oil pump, the active de-aerator having an impeller, the oil pump having a pump shaft mounted for rotation about a central axis within a housing, the method comprising: engaging an end of the pump shaft with a shaft connecting portion of the impeller on a first side of the impeller; engaging the shaft connecting portion of the impeller within a first portion of the housing, the shaft connecting portion and the first portion of the housing having surfaces facing each other adapted to receive a lubricant film therebetween and defining a first journal bearing; and engaging a second portion of the housing with a flange wall of the impeller on a second side of the impeller opposite the first side, the flange wall of the impeller and the second portion of the housing having surfaces facing each other adapted to receive a lubricant film therebetween and defining a second journal bearing.

DESCRIPTION OF THE DRAWINGS

Reference is now made to the accompanying figures in which:

FIG. 2 is a schematic cross-sectional view of an active de-aerator in accordance with an embodiment that may be used within a lubrication system of the aircraft engine of FIG. 1, the cross-sectional view taken along a central axis A of the active de-aerator;

FIG. 3 is a perspective cross-sectional view of the active de-aerator of FIG. 2, the cross-section taken along a central axis A of the active de-aerator.

DETAILED DESCRIPTION

Figure 1:
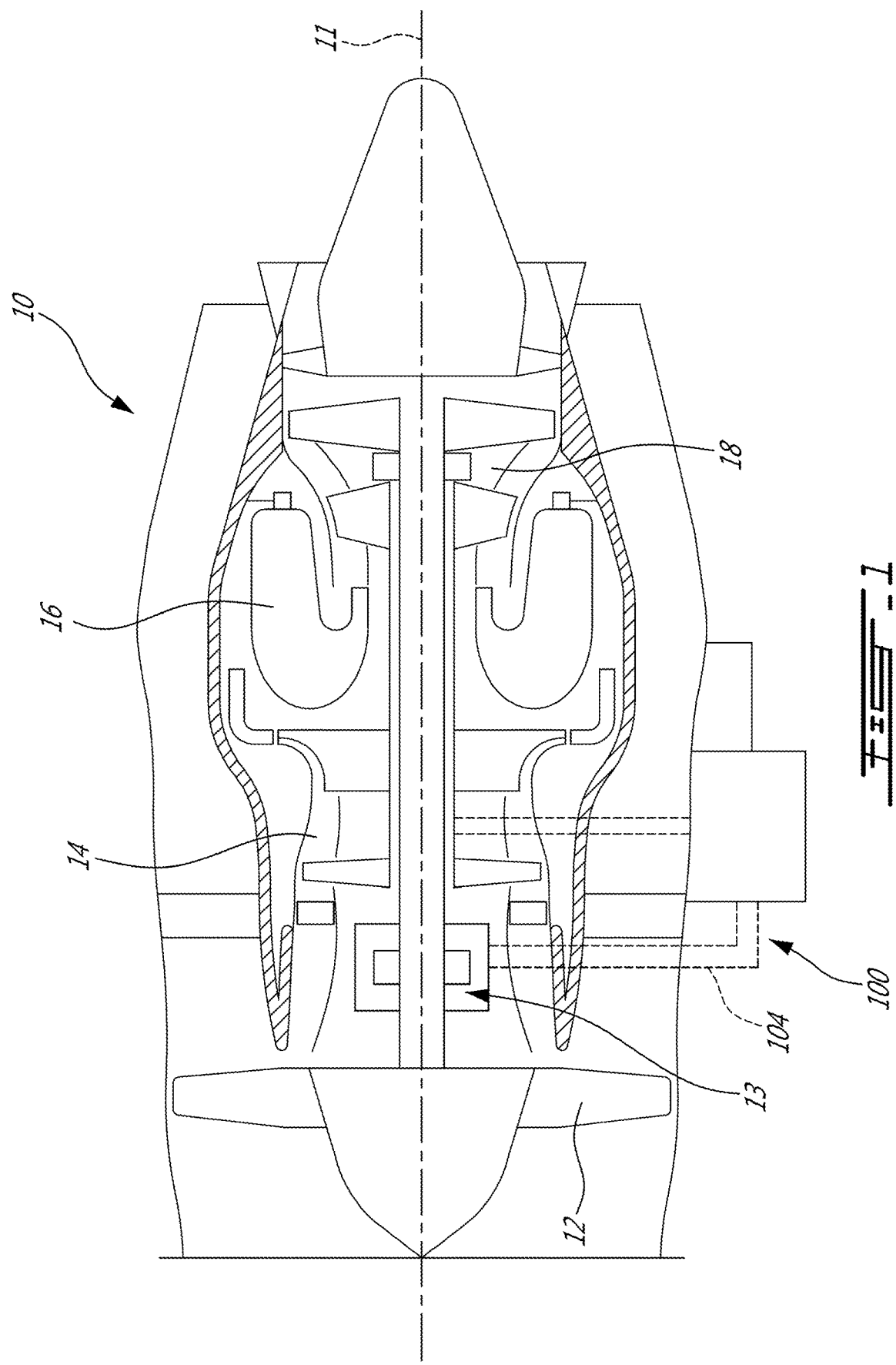
FIG. 1 is a schematic cross sectional view of an aircraft engine provided in the form of a gas turbine engine.

FIG. 1 illustrates an aircraft engine 10, such as a gas turbine engine, of a type preferably provided for use in subsonic flight. The gas turbine engine 10 generally includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

Figure 1A:
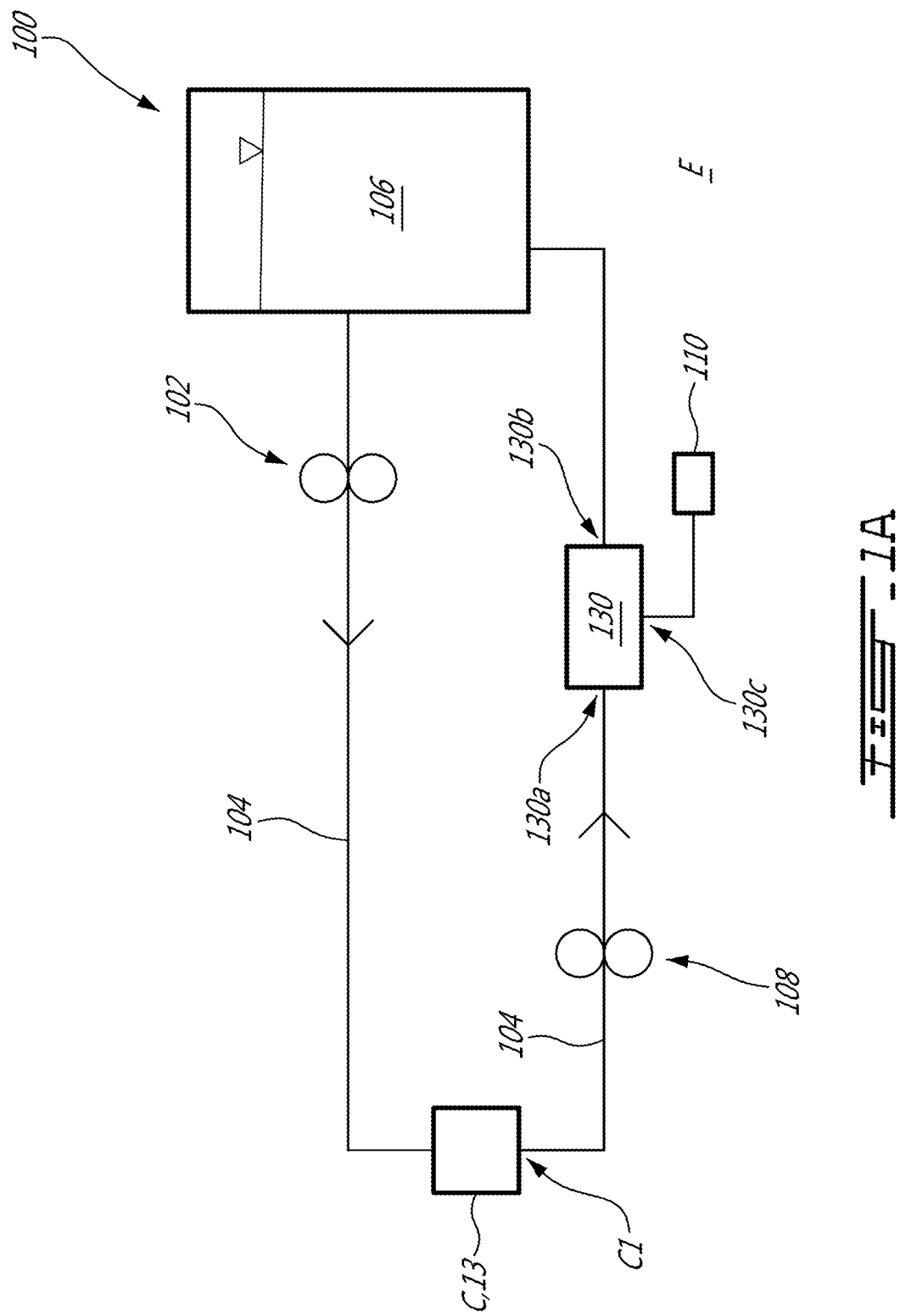
FIG. 1A is a schematic view of a lubrication system used with the aircraft engine of FIG. 1.

Referring to FIGS. 1 and 1A, the gas turbine engine 10 includes a lubrication system 100 that includes one or more pumps 102, lubrication conduits 104 that form a network of conduits, a lubricant reservoir 106, and a de-aerator 130. The lubrication system 100 may also include additional components such as valve(s), heat exchangers, filters, etc. The lubricant reservoir 106 is hydraulically connected to one or more components C of the engine 10 in need of lubrication, such as, for instance, bearing cavity(ies) 13, gearbox(es), and so on. The pump 102 is operable to induce a flow of the lubricant from the lubricant reservoir 106, to the one or more components C of the engine 10 in need of lubrication. A scavenge pump(s) 108 may be present and is operable to draw a scavenge flow of oil back to the reservoir 106. The scavenge pump 108 has an inlet hydraulically connected to a scavenge outlet C1 of the component C and an outlet hydraulically connected to the de-aerator 130. In some cases, for instance when the component C is a bearing cavity 13, the oil flows through the bearing cavity 13 and is mixed with compressed air injected therein for pressurizing the bearing cavity 13. The oil mixture exiting the bearing cavity 13 may thus have a greater air content than the oil mixture entering the bearing cavity 13. The de-aerator 130 is operable to remove at least a portion of the air contained within the air-oil mixture it receives before flowing the oil back to the one or more components in need of lubrication. The de-aerator 130 has an air-oil inlet 130a hydraulically connected to the scavenge outlet C1 of the component C via the scavenge pump 108; an oil outlet 130b hydraulically connected to the reservoir 106 for returning the de-aerated oil back to the reservoir 106; and an air outlet 130c hydraulically connected to a vent 110 for expelling the air out to an environment E outside of the gas turbine engine 10. It will be appreciated that the location of some of the parts of the lubrication system 100 (e.g., scavenge pump 108, pump 102, vent 110) may differ from what is illustrated in FIG. 1A. For instance, the scavenge pump 108 and the active de-aerator 130 may be integrally part of a same pumping system or pumping unit, with the flow passage in between them illustrated in FIG. 1A defined as part of the scavenge pump 108 and/or de-aerator 130.

Any suitable arrangement of the lubrication system 100 is contemplated. The de-aerator 130 may be included in any lubrication systems, such as those discloses in U.S. patent application Ser. No. 16/791,375, the entire contents of which are incorporated herein by reference.

Referring now to FIGS. 2-3, an active de-aerator 130, which may operate as the de-aerator 130 in the lubrication system 100 of FIG. 1A, is illustrated according to an embodiment. The de-aerator 130 is an "active" de-aerator since it has at least one component (e.g., impeller) that is driven, such as by electrical and/or pneumatic and/or hydraulic or other means (motors, actuators, etc.). A de-aerator is different than a de-oiler. A de-oiler is typically located within a lubricated cavity (e.g., gear box) and is designed to remove oil (e.g., oil droplets/mist) within an air-oil mixture before ejecting air overboard. The de-aerator 130 is designed to extract air from an air-oil mixture and to feed oil back to the lubrication system 100. Typically, the de-oiler does not include a housing. In contrast, the housing of the de-aerator 130 is used to collect the oil extracted by centrifugation so that the extracted oil is flown back to the oil system. Since the de-oiler is located within the lubricated cavity, it does not need a housing and the oil may simply be ejected via centrifugation against the components in need of lubrication contained within the lubricated cavity (e.g., gears).

In the depicted embodiment, and referring to FIG. 2, the active de-aerator 130 is driven by an oil pump 140. In the depicted embodiment the active de-aerator 130 is part of the oil pump 140. In other words, the active de-aerator 130 is "built-in" with the oil pump 140, or retrofitted into the oil pump 140. Although shown in isolation in FIGS. 2-3, the oil pump 140 and active de-aerator 130 may function as the scavenge pump 108 and de-aerator 130 schematically illustrated in FIG. 1A. In an embodiment, the oil pump 140 driving the de-aerator 130 in FIGS. 2-3 may be a scavenge pump, such as pump 108 of FIG. 1A.

As shown in FIG. 2, the oil pump 140 has a housing H receiving components forming parts of the active de-aerator 130. In other embodiments, the active de-aerator 130 may be configured as a standalone device that is coupled to an oil pump, or coupled to any device able to generate a rotational input to the de-aerator 130 in yet other embodiments. For instance, the rotational input may be provided by an electric motor, or a shaft of the gas turbine engine 10 (FIG. 1). As shown, the housing H includes a first housing section H1 and a second housing section H2 securable to each other. The first and second housing sections H1, H2 defines a cavity HC (best seen in FIG. 3). A seal(s) S may be provided at an interface between the first and second housing sections H1, H2 to limit leakage of fluid at the interface. In some embodiments, the cavity HC is a sealed cavity, with one or more inlets and outlets allowing fluid flow communication with the sealed cavity.

The oil pump 140 includes flow inducing means 144. In this embodiment, the flow inducing means 144 are intermeshing gears disposed within a flow path of the pump 140 and inducing fluid flow by mutual rotation. Depending on the pump, one or more flow inducing means may be mounted serially or in parallel with one another to form one or more pump stages. The flow inducing means (all or some) may be mounted to a pump shaft 142 for rotation therewith. As another example, the flow inducing means 144 are blades, etc.

The active de-aerator 130 includes an impeller 132. The impeller 132 is received within the housing H and may rotate relative to the housing H about a central axis A.

The impeller 132 is enclosed within the cavity HC defined by the first and second housing sections H1, H2. The impeller 132 has a shaft connecting portion 132a that is drivingly engageable to the oil pump shaft 142 for receiving a rotational input therefrom. As shown, the shaft connecting portion 132a extends axially along central axis A, e.g., concentrically. As shown in FIG. 3, the shaft connecting portion 132a defines an annular body protruding axially from a remainder of the impeller 132. The shaft connecting portion 132a defines a hollow space SH having sections of different bore sizes sized to receive a complementary end of the pump shaft 142. Other shapes of hollow space for connecting with an end of the pump shaft 142 may be contemplated. In the depicted embodiment, the shaft connecting portion 132a and an end 142a of the pump shaft 142 have complementary splines SP (see FIG. 2) for mutual axial engagement, as a possibility among others to rotatably couple them. The shaft connecting portion 132a and the end of the pump shaft 142 may thus be drivingly engaged to each other such that rotational input provided by the pump shaft 142 may induce rotation of the impeller 132. The housing H, here housing section H1, may define a bore BH1 supporting the shaft connecting portion 132a. At least part of the shaft connecting portion 132a may be received within the bore BH1.

The impeller 132 has a rim 132b, which may be referred to as a ring portion and blades 132c that are circumferentially distributed around the central axis A. The rim 132b extends circumferentially around the central axis A and around the blades 132c. In the embodiment shown, the blades 132c are secured to a fore flange 132d that is secured to the shaft connecting portion 132a and to an aft flange 132e, e.g., they may be a monoblock piece. Both of the first and second flanges 132d, 132e are annular and extend all around the central axis A. The fore flange 132d is used to redirect a flow of oil that enters the de-aerator 130 in a substantially axial direction relative to the central axis A to a substantially radial direction relative to the central axis A before the flow of oil meets the blades 132c. The blades 132c have radially inner ends 132f and radially outer ends 132g. In the embodiment shown, the radially outer ends 132g of the blades 132c are secured to the rim 132b of the impeller 132. In the embodiment shown, the blades 132c and the rim 132b are integral and are defined as a single part, though other constructions are possible. The radially inner ends 132f of the blades 132c are located axially between the fore and aft flanges 132d, 132e.

The flow of mixed air-oil passing through the impeller 132 may be turbulent and may create uneven loads as a density of the oil or air within the mixture may continuously vary over instant times. Such uneven loads may induce vibrations. Vibrations and/or shaft impeller shaft deflection may be limited by proper supporting means and configuration within the housing H. In the depicted embodiment, a periphery of the shaft connecting portion 132a and a surface of the bore BH1 facing the periphery of the shaft connecting portion 132a define a journal bearing JB1. A film of oil or other lubricant may be present between the surface of the bore BH1 facing the periphery of the shaft connecting portion 132a and the periphery of the shaft connecting portion 132a. The bore BH1 may thus be referred to as a portion of the housing H supporting the impeller 132 and/or as defining part of the journal bearing JB1. The journal bearing JB1 may be defined by a separate part interfacing with the bore BH1 and the periphery of the shaft connecting portion 132a in other embodiments. For instance, the journal bearing JB1 may be an annular insert slidingly engaged within the bore BH1, which may be replaced when worn out. The active de-aerator 130 has an inlet side I and an opposed outlet side O, which may respectively be referred to as a fore side and an aft side. As opposed to being cantilevered from the end of the pump shaft 142, the impeller 132 is further supported on the outlet side O. As shown, the impeller 132 is rotatably supported within the housing H, here second housing section H2, via another journal bearing JB2. As discussed above, the bore BH1 and the shaft connecting portion 132a of the impeller define the journal bearing JB2, which may be referred to as a first journal bearing for rotatably supporting the shaft connecting portion 132a of the impeller 132 on the inlet side I. The impeller 132 may thus be supported by a pair of journal bearings JB1, JB2 disposed respectively on the inlet and outlet sides I, O of the impeller 132, as opposed to being cantilevered to the pump shaft 142, for instance. The dual journal bearings JB1, JB2 mounting of the impeller 132 within the housing H may increase stability and/or reduce shaft deflection.

The housing H, here the second housing section H2, defines a bore BH2. In the depicted embodiment, the bore BH2 is concentric with the bore BH1 discussed above. The bore BH2 is surrounded by an annular wall BHW. In the depicted embodiment, the second flange 132e defines a flange wall 132h extending axially along the central axis A. The flange wall 132h has a surface facing an outer periphery of the annular wall BHW. As shown, the journal bearing JB2 on the outlet side O of the impeller 132 is defined by the flange wall 132h and the annular wall BHW. A film of lubricant of the journal bearing JB2, between the flange wall 132h and the annular wall BHW may allow lower friction to facilitate rotation. The bore BH2 may thus be referred to as another portion of the housing H supporting the impeller 132 and/or as defining part of the journal bearing JB2. Stated differently, the bores BH1, BH2 are two portions of the housing H that contribute to the support of the impeller 132 and that are adapted to allow rotation of the impeller 132 within the housing H.

The journal bearing JB2 may also be a separate part interfacing between the flange wall 132h and the annular wall BHW in other embodiments. For instance, the journal bearing JB2 may be an annular insert slidingly engaged around the annular wall BHW, which may be replaced when worn out.

The flange wall 132h may be located radially inwardly relative to the annular wall BHW in other embodiments, such that the journal bearing JB2 may be defined between an outer periphery of the flange wall 132h and an inner periphery of the annular wall BHW, for instance.

In the depicted embodiment, the journal bearings JB1, JB2 are delimited (delimited or defined) by cylindrical (cylindrical or substantially cylindrical) surfaces facing each other. Also, as shown, such cylindrical surfaces are extending substantially in an axial direction along central axis A.

The journal bearings JB1, JB2 may be defined by uneven surfaces and/or between surfaces angled (or "oblique") relative to the central axis A in other embodiments. For instance, the journal bearings JB1, JB2 may be conical when viewed in a cross-section as in FIG. 3.

The air-oil inlet 130a of the active de-aerator 130 is located on the inlet side I; and the oil outlet 130b and the air outlet 130c are located on the outlet side O of the de-aerator 130. In the embodiment shown, the air-oil inlet 130a, the oil outlet 130b, and the air outlet 130c are defined by the housing H. In operation, for separating the air from the air-oil flow, the air-oil mixture is received via the air-oil inlet 130a of the de-aerator 130 in a generally axial direction relative to the central axis A of the impeller 132. The received air-oil flow is redirected in a radial direction relative to the central axis A and the air is separated from the air-oil flow by centrifugation within the impeller 132. Stated differently, oil is directed radially outward of the second flange 132e by centrifugal forces and follows the path to the oil outlet 130b. Air may on the other hand follow the more central path to flow instead to the air outlet 130c. The extracted air may thus be expelled out from the impeller 132 at a radially inward location relative to the oil flowing out from the impeller 132. The journal bearings JB1, JB2 are hydraulically connected with the air-oil inlet 130a and the oil outlet 130b, which may allow constant lubrication of the journal bearings JB1, JB2 in operation. Oil leaking from the journal bearings JB1, JB2 may thus be flushed with the air-oil mixture as the air-oil flow passes through the impeller 132 and/or flushed with the oil exiting the impeller 132 via the oil outlet 130b. Such dual journal bearings JB1, JB2 mounting of the impeller 132 may thus be advantageous in the context of oil and/or air-oil environment, whereas such dual journal bearings JB1, JB2 mounting of impeller 132 may not be desirable in other environment without such oil or air-oil interaction.

The impeller 132 may further have a tube 132i connected to the second flange 132e. As shown, the tube 132i is integral with the second flange 132e. The tube 132i is concentric with the central axis A. The tube 132i has an internal passage P4 which is fluidly connected to the air outlet 130c. The separated air from the mixture of air-oil may thus be channeled through the tube 132i and expelled into the air outlet 130c. The tube 132i defines an axial end of the impeller 132 that is opposite the shaft connecting portion 132a discussed above. The tube 132i is located on one axial side of the blades 132c of the impeller 132, opposite to the axial side of the blades 132c where the shaft connecting portion 132a is located. In the depicted embodiment, at least part of the tube 132i is radially aligned with the journal bearing JB2 along the central axis A.

The tube 132i is received within the bore BH2. A seal(s), here a lip seal LS, interfaces with a periphery of the tube 132i and the wall BHW of the bore BH2. As shown, the lip seal LS is secured between the outer periphery of the tube 132i and an inner periphery of the wall BHW. The lip seal LS may prevent or limit oil leakage through the air outlet 130c, which may in turn limit oil contamination of the air outlet 130c and other components downstream thereof, if applicable. The lip seal LS is typically resilient and/or flexible to allow proper sealing at the interface of opposite surfaces (here radial surfaces). While the lip seal LS interfaces between the tube 132i and the wall BHW, it may not serve the function of radially supporting the impeller 132, as opposed to the journal bearings JB1, JB2 discussed above, as the lip seal LS may radially deflect, for instance as a result of its low radial rigidity and/or its geometry. The journal bearings JB1, JB2 typically allow for a limited radial deflection, as a consequence of the gap sized to allow a thin film of lubricant between the journal bearings surfaces. For instance, in an embodiment, a radial dimension of the gap and/or lubricant film is between 0.001 to 0.002 inch. Other types of seals may be contemplated in other embodiments.

In the depicted embodiment, the journal bearing JB2 is radially outward relative to the lip seal LS. The journal bearing JB2 is fluidly connected to the oil outlet 130b radially outward from the lip seal LS, while the lip seal Ls may prevent or at least limit interaction of the air flowing out from the impeller 132 through the tube 132i with the journal bearing JB2. The lip seal LS may thus act as a "air barrier" between the tube 132i by which air may exit the impeller 132 and the journal bearing JB2. While the journal bearing JB2 is located between the outer periphery of the wall BHW and the inner periphery of the flange wall 132h in the embodiment shown, the journal bearing JB2 may be disposed at the location of the lip seal LS in other embodiments. For instance, the journal bearing JB2 in embodiments that are not shown herein may be between the outer periphery of the tube 132i and the inner periphery of the wall BHW, in series with the lip seal LS, if the lip seal LS is present in such embodiments.

Figure 3A:
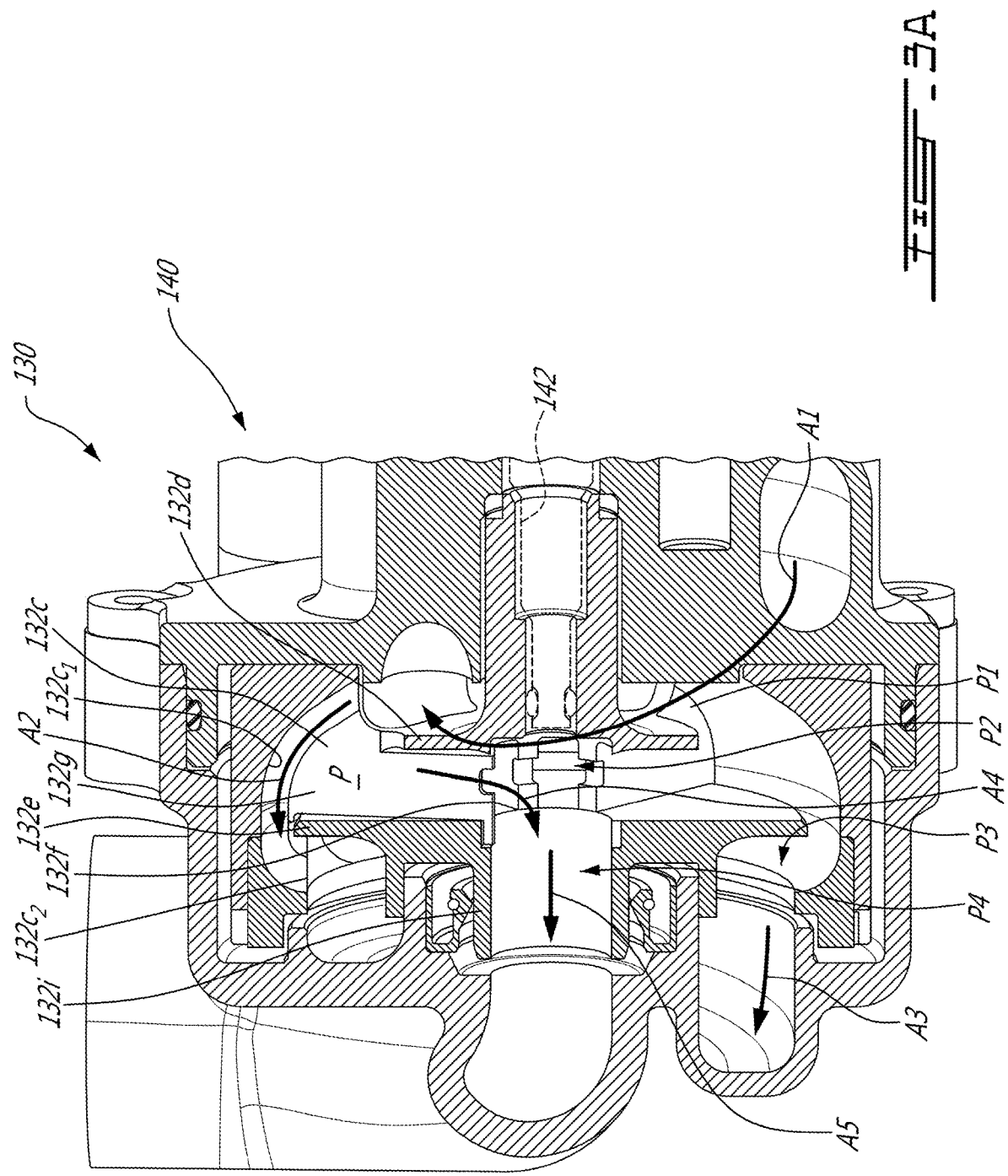
FIG. 3A is another perspective cross-sectional view of the active de-aerator as FIG. 3, now with references to flow passages of the active de-aerator, the cross-section taken along a central axis A of the active de-aerator.

Referring to FIG. 3A, a plurality of flow passages P are defined circumferentially between each two circumferentially adjacent ones of the blades 132c. The flow passages P have passage inlets P1 extending radially between a periphery of the first flange 132d and the rim 132b, extending circumferentially between each two adjacent ones of the blades 132c, and extending axially between the rim 132b and the fore flange 132d. In the depicted embodiment, the inlets P1 of the flow passages P face a direction which has a radial component relative to the central axis A. In the embodiment shown, the radial component of the inlets P1 of the flow passages P is oriented away from the central axis A. The flow passages P have air outlets P2 proximate the central axis A. The air outlets P2 of the flow passages P are defined circumferentially between each of two adjacent ones of the radially inner ends 132f of the blades 132c and axially between the fore and aft flanges 132d, 132e.

The flow passages P further have oil outlets P3 located axially between an axial end of the rim 132b and the aft flange 132e. More specifically, a portion 132c1 of the blades 132c extends radially beyond and curves around a radially outer edge of the aft annular flange 132e when viewed in a cross-section as in FIG. 3A. The portions 132c1 of the blades 132c that extend radially outwardly around the aft flange 132e have radially inner ends 132c2 that are located on a downstream side of the aft flange 132e. The oil outlets P3 are defined circumferentially between each two adjacent ones of the radially inner ends 132c2 of the portions 132c1 of the blades 132c.

The flow passages P further include the internal passage P4 defined by the hollow tube 132i. The internal passage P4 is fluidly connected to the air outlets P2 of the flow passages P defined between the blades 132c of the impeller 132.

In use, an air-oil mixture is received into the de-aerator 130 via the air-oil inlet 130a along arrow A1. The oil is diverted radially outwardly away from the central axis A by the fore flange 132d. The oil is then divided between the flow passages P upon rotation of the fore flange 132d and enters those flow passages P via their respective inlets P1. The oil is then impinged by the blades 132c of the impeller 132. Such impingement may cause separation of the air contained in the air-oil mixture from the oil. The separated oil flows within the flow passages P defined between the blades 132c, around the periphery of the second flange 132e along arrow A2 and exits the flow passages P via the oil outlet P3 defined axially between the aft flange 132e and the rim 32b and circumferentially between the radially-inner ends 132c2 of the portions 132c1 of the blades 132c that extend aft of the aft flange 132e. The oil then exits the de-aerator 130 via the oil outlet 130b thereof along arrow A3. As shown in FIG. 1A, the extracted oil is then flown back to the reservoir 106, through which it is circulated to the components (e.g., bearing cavity 13) in need of lubrication. The air extracted from the air-oil mixture flows around a periphery of the first flange 132d along flow path A4, moves radially inwardly toward the central axis A, and exits the flow passages P via their air outlets P2 defined circumferentially between the radially-inner ends 132f of the portions of the blades 132c that are located between the fore and aft flanges 132d, 132e. The extracted air then flows into the passage P4 of the hollow tube 132i along arrow A5 and out of the de-aerator 130 via the air outlet 130c.

In the embodiment shown, the disclosed de-aerator 130 has solely two outlets: the oil outlet 130b and the air outlet 130c. In the present case, the de-aerator 130 has solely three connections to the oil system 100 (FIG. 1A), that is the air-oil inlet 130a, the air outlet 130c, and the oil outlet 130b, and is free of other connections to the oil system 100.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An active de-aerator for an aircraft engine, comprising:
   a housing having an air-oil inlet, an oil outlet and an air outlet;
   an impeller received within and rotatable relative to the housing about a central axis;
   a first journal bearing on a first side of the impeller for rotatably supporting the impeller relative to the housing; and
   a second journal bearing on a second side of the impeller for rotatably supporting the impeller relative to the housing, the second side being opposite the first side.

2. The active de-aerator as defined in claim 1, wherein the active de-aerator is adapted to be driven by an oil pump, the impeller defining a shaft connecting portion for connecting the impeller to an end of a pump shaft.

3. The active de-aerator as defined in claim 1, wherein the impeller defines a shaft connecting portion for connecting the impeller to an end of a pump shaft, the first journal bearing defined by a portion of the housing and the shaft connecting portion of the impeller.

4. The active de-aerator as defined in claim 3, wherein a periphery of the shaft connecting portion and a surface of the housing facing the periphery of the shaft connecting portion define the first journal bearing.

5. The active de-aerator as defined in claim 3, wherein the portion of the housing defines a bore, at least part of the shaft connecting portion is received within the bore.

6. The active de-aerator as defined in claim 5, wherein the bore is a first bore, the housing defining a second bore defining an annular wall, the first and second bores located respectively on the first and the second sides of the impeller, the impeller defining a tube extending along the central axis and received within the second bore and a flange wall extending about the tube and axially along the central axis, the annular wall located radially between the tube and the flange wall, a seal interfacing with a periphery of the tube and an inner periphery of the annular wall, the flange wall and an outer periphery of the annular wall defining the second journal bearing.

7. The active de-aerator as defined in claim 1, wherein the impeller defines a flange, the second journal bearing defined by a portion of the housing and the flange of the impeller.

8. The active de-aerator as defined in claim 1, wherein the impeller has blades circumferentially distributed about the central axis, the first and second sides of the impeller being on opposite sides of the blades along the central axis, the first and second journal bearings defined by surfaces of the impeller and the housing facing each other, the surfaces being on the opposite sides of the blades, extending in an axial direction along the central axis and adapted to receive a lubricant film therebetween.

9. The active de-aerator as defined in claim 1, wherein the impeller defines a flange wall extending axially along the central axis and the housing defines an annular wall, the flange wall facing the annular wall of the housing, the flange wall of the impeller and the annular wall of the housing interfacing each other to define the second journal bearing.

10. The active de-aerator as defined in claim 9, wherein the flange wall is radially outward relative to the annular wall, such that the flange wall has a surface facing an outer periphery of annular wall.

11. The active de-aerator as defined in claim 1, wherein the air-oil inlet is defined on the first side of the impeller and the oil outlet is defined on the second opposite side of the impeller the first and second journal bearings hydraulically connected with the air-oil inlet and the oil outlet.

12. The active de-aerator as defined in claim 1, wherein the air-oil inlet is defined on the first side of the impeller, and the air outlet and the oil outlet defined on the second side of the impeller, the impeller defining a tube extending along the central axis and concentric therewith, the tube defining an internal passage in fluid flow communication with the air outlet.

13. The active de-aerator as defined in claim 1, wherein the housing has a first housing section and a second housing section, the first housing section and the second housing section defining a housing cavity therebetween and enclosing the impeller, a portion of the first housing section defining part of the first journal bearing on the first side of the impeller and a portion of the second housing section defining part of the second journal bearing on the second opposite side of the impeller.

14. A lubrication system of an aircraft engine, comprising:
a lubricant reservoir fluidly connected to lubrication conduits;
at least one pump fluidly connected to the lubricant reservoir and the lubrication conduits for inducing a flow of lubricant within the lubrication conduits, the pump having a housing and a pump shaft mounted for rotation about a central axis within the housing, the housing defining an air-oil inlet, an oil outlet and an air outlet; and
a de-aerator having an impeller received within and rotatable relative to the housing about the central axis, the impeller connected to the pump shaft for rotation therewith, a first journal bearing on a first side of the impeller for rotatably supporting the impeller relative to the housing, and a second journal bearing on a second side of the impeller for rotatably supporting the impeller relative to the housing, the second side being opposite the first side.

15. The lubrication system as defined in claim 14, wherein the first and the second journal bearings are defined by surfaces of the impeller and the housing that face each other, the surfaces extending in an axial direction along the central axis and adapted to receive a lubricant film therebetween.

16. The lubrication system as defined in claim 14, wherein the impeller has an internal passage in fluid flow communication with the air outlet, the air outlet connected to a vent for expelling the air out to an environment outside the aircraft engine.

17. The lubrication system as defined in claim 14, wherein the air-oil inlet is defined on the first side of the impeller and the oil outlet is defined on the second opposite side of the impeller, the first and the second journal bearings hydraulically connected with the air-oil inlet and the oil outlet.

18. The lubrication system as defined in claim 14, wherein the housing has a first housing section and a second housing section, the first housing section and the second housing section defining a housing cavity therebetween and enclosing the impeller, a portion of the first housing section defining part of the first journal bearing on the first side of the impeller and a portion of the second housing section defining part of the second journal bearing on the second opposite side of the impeller.

19. The lubrication system as defined in claim 14, wherein the impeller has a shaft connecting portion on the first side thereof and a flange wall on the second opposite side thereof, the shaft connecting portion and the flange wall defining respective parts of the first and the second journal bearings.

20. The lubrication system as defined in claim 14, wherein the impeller defines a flange wall extending axially along the central axis and the housing defines an annular wall, the flange wall facing the annular wall of the housing, the flange wall of the impeller and the annular wall of the housing interfacing each other to define the second journal bearing.

* * * * *